3,252,930
INTERMEDIATES IN THE SYNTHESIS OF 1α-HYDROXY-3-KETOSTEROIDS
Leland L. Smith, Malvern, and Theodore J. Foell, King of Prussia, Pa., assignors to American Home Products Corporation, New York, N.Y., a corporation of Delaware
No Drawing. Filed June 8, 1964, Ser. No. 373,519
5 Claims. (Cl. 260—239.55)

The present invention relates to a novel process for the chemical synthesis of 1α-hydroxy-3-ketosteroids which are of value because of their hormonal properties and more particularly because of their androgenic activity, and to novel intermediates produced by said process.

More particularly, the present invention relates to the synthesis of 1α-hydroxy-5α-androstan-3-ones and 1α-hydroxy-5α-estran-3-ones.

Dodson et al., reported in the J. Am. Chem. Soc., 82, 4026 (1960), the prior synthesis of 1α-hydroxy-5α-androstane-3,17-dione. Their synthesis entailed the microbiological hydroxylation and reduction of the Δ$^4$-double bond of 4-androstane-3,17-dione by a species of Penicillium. Heretofore, no purely chemical synthesis of 1α-hydroxy-5α-androstane-3,17-dione has been reported.

The novel process of this invention and the compounds produced thereby are illustrated by the following equation:

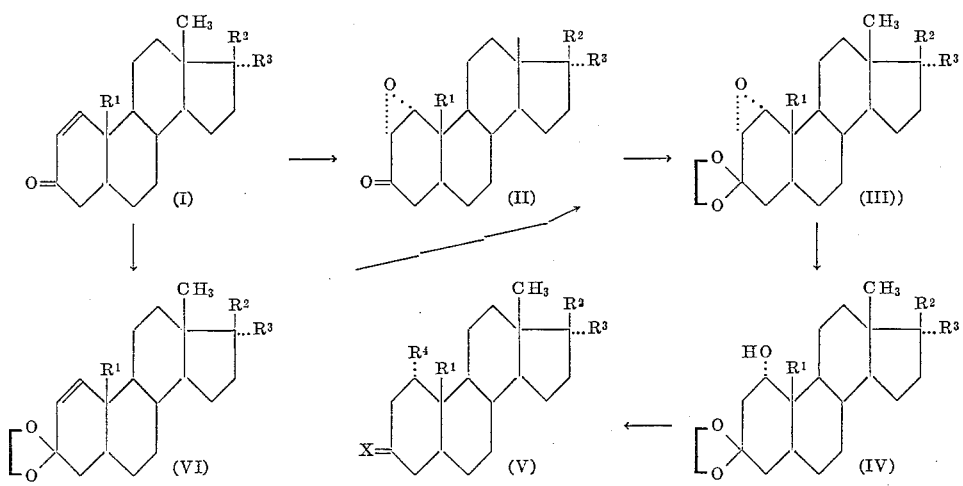

In the above formulas, $R^1$ is H or methyl; $R^2$ is hydroxy or acyloxy; $R^3$ is H, lower alkyl, lower alkenyl, or lower alkynyl, and $R^2$ and $R^3$ taken together are =O or alkylenedioxy; $R^4$ is hydroxy or lower acyloxy; X is oxo or alkylenedioxy.

As used herein, the term lower alkyl refers to those alkyl groups having from 1 to about 5 carbon atoms, and, more particularly, to those having less than 3 carbon atoms. Such groups may be normal or branched in structure although the normal chain is preferred. Examples of suitable alkyl groups include methyl, ethyl, propyl, isopropyl, butyl, isobutyl and pentyl. The term lower acyl as employed herein refers to those hydrocarbons carboxylic groups having from 1 to about 5 carbon atoms. Such radicals as acetyl, propionyl and butyryl are therefore comprehended within this term. The term lower acyloxy refers to those radicals derived from an organic acid having less than 6 carbon atoms by the removal of hydrogen therefrom. The term lower alkenyl refers to those unsaturated hydrocarbon radicals having at least one double bond in a chain containing from 2 to 10 carbons, such as allyl, vinyl and the like. By the term lower alkynyl as employed herein is meant those unsaturated hydrocarbon radicals containing at least one triple bond and having from 2 to 6 carbon atoms, such as ethynyl, pentynyl and hexynyl. As used herein in term alkylenedioxy includes ketal groups having from 2 to about 10 carbon atoms but preferably not more than about 4 carbon atoms.

It should be noted that in the case of a starting material (I) where $R^2$ is acyloxy or where $R^3$ is H, lower alkyl, lower alkenyl or lower alkynyl, such substituents remain unchanged during the process of the invention. For purposes of illustration, however, the process will be described by reference to starting materials where $R^2$ and $R^3$ taken together form an oxo group.

In practicing the present process a starting material which may be a 5α-androst-1-ene-3,17-dione (I), prepared for example as disclosed in U.S. Patent No. 3,007,947, is either epoxidized to form the corresponding 1α,2α-epoxyandrostane-3-one (II) or is ketalized to form the corresponding Δ$^1$-3-ketal (VI). Compound III is then obtained by either ketalizing compound (II) or by epoxidizing compound (VI).

Reduction of compound (III) with a metal hydride such as lithium aluminum hydride produces the corresponding 1α-hydroxy compound (IV) whch is hydrolysed with acetic acid to remove the 3-ketal function thereby forming compound (V). Conventional acylation of compound (V) with an acylating agent such as an anhydride of a hydrocarbon carboxylic acid of the type defined hereinbefore furnishes the corresponding compound where $R^4$ is lower acyloxy.

In the practice of the process of the invention, ketalization of the 1α,2α-epoxy androstane-3-one can be achieved in good yields by refluxing the starting material in solution in an organic solvent, for example benzene, containing an alkylene glycol and an alkylphenylsulfonic acid, such as p-toluenesulfonic acid monohydrate, and removing water from the reaction mixture as it forms. Refluxing is continued until the substantial completion of the reaction, a fact signalled, for example, by the collection of the theoretical amount of water of reaction in a water separator, if such was used. The organic solution is then cooled, neutralized with base and washed with water until it is neutral. The now-neutral solution is dried and evaporated under vacuum to yield the 1α,2α-epoxyandrostane-3-one 3-ketal.

Reduction of the above 3-ketal is advantageously carried out by dissolving this material in an organic solvent such as ether and adding dropwise the resulting solution to a slurry of lithium aluminum hydride in anhydrous ether. Following mixing of the reactants, additional anhydrous ether is added to the reaction mixture which is then refluxed for several hours. Water is then added to the mixture. The organic layer which separates is then dried. A solvent such as methanol is added to the dried organic layer. Vacuum distillation of the solution precipitates the 1α-hydroxy product which still bears a ketal function in the 3-position. This function is then removed by dissolving and refluxing the compound in a methanol solution acidified with a weak acid such as acetic acid. The solution is then cooled and neutralized. Water is added and the methanol is removed under vacuum to precipitate a solid which is extracted with chloroform. Partial evaporation of the chloroform extracts yields the 1α-hydroxyandrostan-3-one which can be purified by recrystallization from benzene.

The following examples serve to illustrate but not to limit the present invention:

EXAMPLE I

*1α,2α-epoxy-5α-androstane-3,17-dione 3,17-bisethylene ketal*

Four grams of 1α,2α-epoxy-5α-androstane-3,17-dione, prepared as described in J. Org. Chem. 23, 929 (1958), was dissolved in 200 ml. of benzene and 9.2 ml. of ethylene glycol and 40 mg. of p-toluenesulfonic acid monohydrate was added. The mixture was refluxed with a Dean-Stark water removal apparatus for five hours. The cooled solution was neutralized with 0.1 N methanolic potassium hydroxide solution and washed with water until neutral. The benzene solution was dried over anhydrous magnesium sulfate and evaporated under vacuum. After washing the residue with methanol, there was obtained 4.8 g. of 1α,2α-epoxy-5α-androstane-3,17-dione 3,17-bisethylene ketal, M.P. 150–155°; $[\alpha]_D$ —17.4°.

*Analysis.*—Calcd. for $C_{23}H_{34}O_5$: C, 70.74; H, 8.78. Found: C, 70.88; H, 8.66.

When applying the above described procedure to the compounds listed below, the corresponding products hereinafter set forth are obtained:

| Reactant | Product |
|---|---|
| 1α,2α-epoxy-17β-hydroxy-17α-methyl-5α-androstan-3-one. | 1α,2α-epoxy-17β-hydroxy-17α-methyl-5α-androstan-3-one 3-ethylene ketal. |
| 1α,2α-epoxy-17β-hydroxy-5α-androstan-3-one. | 1α,2α-epoxy-17β-hydroxy-5α-androstan-3-one 3-ethylene ketal. |
| 17β-acetoxy-1α,2α-epoxy-5α-androstan-3-one. | 17β-acetoxy-1α,2α-epoxy-5α-androstan-3-one 3-ethylene ketal. |
| 1α,2α-epoxy-17β-hydroxy-17α-ethynyl-5α-androstan-3-one. | 1α,2α-epoxy-17β-hydroxy-17α-ethynyl-5α-androstan-3-one 3-ethylene ketal. |
| 1α,2α-epoxy-17β-hydroxy-17α-pentynyl-5α-androstan-3-one. | 1α,2α-epoxy-17β-hydroxy-17α-pentynyl-5α-androstan-3-one 3-ethylene ketal. |
| 1α,2α-epoxy-17α-hexynyl-17β-hydroxy-5α-androstan-3-one. | 1α,2α-epoxy-17α-hexynyl-17β-hydroxy-5α-androstan-3-one 3-ethylene ketal. |
| 1α,2α-epoxy-17β-hydroxy-17α-vinyl-5α-androstan-3-one. | 1α,2α-epoxy-17β-hydroxy-17α-vinyl-5α-androstan-3-one 3-ethylene ketal. |
| 1α,2α-epoxy-17β-hydroxy-17α-propenyl-5α-androstan-3-one. | 1α,2α-epoxy-17β-hydroxy-17α-propenyl-5α-androstan-3-one 3-ethylene ketal. |

EXAMPLE 2

*3,17-bisethylenedioxy-5α-androstan-1α-ol*

One gram of the product from Example I was dissolved in 50 ml. of ether and was added dropwise over a 30 minute period to a stirred slurry of 0.5 g. of lithium aluminum hydride in 50 ml. of dry ether. An additional 150 ml. of dry ether was added and the mixture was refluxed for 2.5 hours. Ten milliliters of water was added and the ether layer was separated and dried over anhydrous sodium sulfate. Methanol was added and the solvents were evaporated under vacuum until crystallization began. The crystalline product, 3,17-bisethylenedioxy-5α-androstan-1α-ol was removed by filtration and was recrystallized from methanol twice, yielding the pure product, M.P. 179–180°; $[\alpha]_D$ +7.1°.

*Analysis.*—Calcd. for $C_{23}H_{36}O_5$: C, 70.37; H, 9.24. Found: C, 70.31; H, 9.45.

By the same technique the compounds listed below are converted to the products hereinafter set forth.

| Reactant | Product |
|---|---|
| 1α,2α-epoxy-17β-hydroxy-17α-methyl-5α-androstan-3-one 3-ethylene ketal. | 3-ethylenedioxy-17α-methyl-5α-androstane-1α,17β-diol. |
| 1α,2α-epoxy-17β-hydroxy-5α-androstan-3-one 3-ethylene ketal. | 3-ethylenedioxy-5α-androstane-1α,17β-diol. |
| 1α,2α-epoxy-17β-aceotxy-5α-androstan-3-one 3-ethylene ketal. | 17β-acetoxy-3-ethylenedioxy-5α-androstane-1α-ol. |
| 1α,2α-epoxy-17β-hydroxy-17α-ethynyl-5α-androstane-3-one 3-ethylene ketal. | 3-ethylenedioxy-17α-ethynyl-5α-androstane-1α,17β-diol. |
| 1α,2α-epoxy-17β-hdyroxy-17α-pentynyl-5α-androstan-3-one 3-ethylene ketal. | 3-ethylenedioxy-17α-pentynyl-5α-androstane-1α,17β-diol. |
| 1α,2α-epoxy-17α-hexynyl-17β-hydroxy-5α-androstan-3-one 3-ethylene ketal. | 3-ethylenedioxy-17α-hexynyl-5-α androstane-1α,17β-diol. |
| 1α,2α-epoxy-17β-hydroxy-17α-vinyl-5α-androstan-3-one 3-ethylene ketal. | 3-ethylenedioxy-17α-vinyl-5α-androstane-1α,17β-diol. |
| 1α,2α-epoxy-17β-hydroxy-17α-propenyl-5α-androstan-3-one 3-ethylene ketal. | 3-ethylenedioxy-17α-propenyl-5α--androstane-1α,17β-diol. |

EXAMPLE 3

*1α-hydroxy-5α-androstane-3,17-dione*

A solution of 19.6 g. of 3,17-bisethylenedioxy-5α-androstan-1α-ol in 960 ml. of methanol and 480 ml. of 50% aqueous acetic acid was refluxed under nitrogen for one hour. The cooled solution was neutralized with solid sodium carbonate and 500 ml. of water was added. The methanol was removed under vacuum, and the precipitated product was filtered, washed with water, and dried. The filtrates were extracted with chloroform, the chloroform extract was then used to dissolve the solids previously removed by filtration. The chloroform solution was dried over anhydrous magnesium sulfate and evaporated to about 20 ml. at which time crystallization began. The cooled solution deposited 10.58 g. of crystalline product. From the concentrated mother liquor an additional 1.96 g. of product was recovered. Recrystallization of a portion of product from benzene gave pure 1α-hydroxy-5α-androstane-3,17-dione, M.P. 206–207.5°; $[\alpha]_D$ +112.0° (chloroform).

Dodson et al., J. Am. Chem. Soc., 82, 4026 (1960), report M.P. 204–206°; $[\alpha]_D$+114° for this compound.

By the same technique described in Example 3, the compounds listed below are converted to the products hereinafter set forth.

| Reactant | Product |
|---|---|
| 3-ethylenedioxy-17α-methyl-5α-androstane-1α,17β-diol. | 1α,17β-dihydroxy-17α-methyl-5α androstan-3-one. |
| 3-ethylenedioxy-5α-androstane-1α,17β-diol. | 1α,17β-dihydroxy-5α-androstan-3-one. |
| 17β-acetoxy-3-ethylenedioxy-5α-androstan-1α-ol. | 17β-acetoxy-1α-hydroxy-5α-androstan-3-one. |
| 3-ethylenedioxy-17α-ethynyl-5α-androstane-1α,17β-diol. | 17α-ethynyl-1α,17β-dihydroxy-5α-androstan-3-one. |
| 3-ethylenedioxy-17α-pentynyl-5α-androstane-1α,17β-diol. | 1α,17β-dihydroxy-17α-pentynyl-5α-androstan-3-one. |
| 3-ethylenedioxy-17α-hexynyl-5α-androstane-1α,17β-diol. | 1α,17β-dihydroxy-17α-hexynyl-5α-androstan-3-one. |
| 3-ethylenedioxy-17α-vinyl-5α-androstane-1α,17β-diol. | 1α,17β-dihydroxy-17α-vinyl-5α-androstan-3-one. |
| 3-ethylenedioxy-17α-propenyl-5α-androstane-1α,17β-diol. | 1α,17β-dihydroxy-17α-propenyl-5α-androstan-3-one. |

Acylation of 1 g. of the foregoing compounds in 4 ml. of pyridine by treating with 2 ml. of propionic anhydride at room temperature, pouring into ice water, and recovering the precipitate yields the following products:

1-propionate of 1-hydroxy-5α-androstane-3,17-dione;
1-propionate of 1α,17β-dihydroxy-17α-methyl-5α-androstan-3-one;

1,17-dipropionate of 1α,17β-dihydroxy-5α-androstan-3-one;

1-propionate of 17β-acetoxy-1α-hydroxy-5α-androstan-3-one;

1-propionate of 17α-ethynyl-1α,17β-dihydroxy-5α-androstan-3-one;

1-propionate of 1α,17β-dihydroxy-17α-pentynyl-5α-androstan-3-one;

1-propionate of 1α,17β-dihydroxy-17α-hexynyl-5α-androstan-3-one;

1-propionate of 1α,17β-dihydroxy-17α-vinyl-5α-androstan-3-one;

1-propionate of 1α,17β-dihydroxy-17α-propenyl-5α-androstan-3-one.

Acylation with acetic anhydride of the same compounds as above treated with propionic anhydride yields the corresponding 1-acetates.

The following examples illustrate the preparations of other compounds comprehended by this invention.

EXAMPLE 4

*17β-acetoxy-1α,2α-epoxy-5α-estran-3-one*

One gram of 17β-acetoxy-1-estren-3-one dissolved in 15 ml. of methanol was cooled to 10°, at which time 1 ml. of 30% hydrogen peroxide was added, followed by 0.2 ml. of 10% aqueous sodium hydroxide solution in 5 ml. of methanol. The mixture was maintained between 15-20° for fifteen minutes, at which time water was added, and the precipitated solids were filtered. The solids weighed 925 mg., M.P. 148–150°. After several recrystallizations from acetone-hexane solvent mixtures, the pure product 17β-acetoxy-1α,2α-epoxy-5α-estran-3-one was obtained, M.P. 156.0–158.5°; [α]$_D$ +149.1°;

$\lambda^{KBr}_{max.}$ 5.77μ, 8.01μ

*Analysis.*—Calcd. for $C_{20}H_{28}O_4$: C, 72.26; H, 8.49. Found: C, 72.29; H, 8.40.

EXAMPLE 5

*17β-acetoxy-1α,2α-epoxy-5α-estran-3-one-3-ethylene ketal*

A solution of 1.24 g. of 17β-acetoxy-1α,2α-epoxy-5α-estran-3-one in 50 ml. of benzene was treated with 100 mg. of p-toluene-sulfonic acid monohydrate and 10 ml. of ethylene glycol. The mixture was refluxed overnight with continuous removal of water, cooled, neutralized with sodium bicarbonate solution, and finally washed with water. The dried benzene layer was then evaporated under vacuum, and the solids thus obtained were recrystallized from acetone-hexane, to yield 17β-acetoxy-1α,2α-epoxy-5α-estran-3-one-3-ethylene ketal.

EXAMPLE 6

*17β-acetoxy-1α-hydroxy-5α-estran-3-one-3-ethylene ketal*

A solution of 17β-acetoxy-1α,2α-epoxy-5α-estran-3-one-3-ethylene ketal in dry diethyl ether is treated with the calculated amount of lithium aluminum hydride in dry ether in the same manner as described in Example 2. After refluxing the mixture for three hours the reaction was terminated and processed to a pure product, 17β-acetoxy-1α-hydroxy-5α-estran-3-one-3-ethylene ketal, in the same way as described for the androstane compound in Example 2.

EXAMPLE 7

*17β-acetoxy-1α-hydroxy-5α-estran-3-one*

A solution of 17β-acetoxy-1α-hydroxy-5α-estran-3-one-3-ethylene ketal in methanolic 50% aqueous acetic acid was refluxed for one hour and processed in exactly the same manner as described in Example 3. The purified product, 17β-acetoxy-1α-hydroxy-5α-estran-3-one, was obtained by recrystallization from benzene.

The compounds of this invention can be administered with pharmaceutically acceptable inert carriers in a wide variety of oral or parenteral unit dosage forms containing from 5 to 500 mg. of active ingredients, either alone, or in admixture with other active compounds for the management of conditions requiring medicaments having androgenic and androgen antagonism properties.

The present invention also includes the process of bringing the compounds thereof into a form suitable for therapeutic administration by associating them with liquid or solid, pharmaceutically acceptable carriers.

What is claimed is:

1. A compound of the formula:

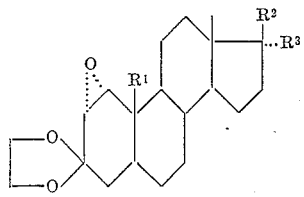

wherein $R^1$ is selected from the group consisting of hydrogen and methyl, $R^2$ is selected from the group of hydroxy and lower acyloxy, and $R^3$ is selected from the group of lower alkyl, lower alkenyl and lower alkynyl.

2. A compound of the formula:

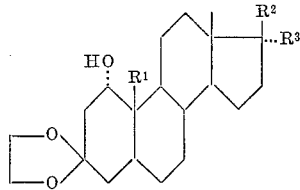

wherein $R^1$ is selected from the group consisting of hydrogen and methyl, $R^2$ is selected from the group of hydroxy and lower acyloxy, and $R^3$ is selected from the group of lower alkyl, lower alkenyl and lower alkynyl.

3. 17β-lower acyloxy-1α-hydroxy-5α-estran-3-one 3-ethylene ketal.

4. 17β-acetoxy-1α-hydroxy-5α-estran-3-one 3-ethylene ketal.

5. 17β - acetoxy - 1α,2α - epoxy - 5α - estran - 3 - one 3-ethylene ketal.

References Cited by the Examiner

UNITED STATES PATENTS

| | | | |
|---|---|---|---|
| 2,851,454 | 9/1958 | Pappo et al. | 260—239.55 |
| 2,980,710 | 4/1961 | Counsell et al. | 260—397.3 |
| 3,080,397 | 3/1963 | Bowers et al. | 260—397.4 |
| 3,118,916 | 1/1964 | Goedicke | 260—397.4 |

OTHER REFERENCES

Dodson et al.: J.A.C.S. 82 pp., 4026–33 (1960), p. 4027 relied on.

Hoehn: J. Org. Chem., 23 pp., 929–30 (1958).

Loewenthal: Tetrahedron, 6 pp., 269–303 (1959), pp. 287–290 relied on.

LEWIS GOTTS, *Primary Examiner.*

HENRY A. FRENCH, *Assistant Examiner.*